United States Patent
Nagami et al.

(10) Patent No.: US 10,101,565 B2
(45) Date of Patent: Oct. 16, 2018

(54) IMAGING LENS AND IMAGING APPARATUS

(71) Applicant: FUJIFILM Corporation, Tokyo (JP)

(72) Inventors: Ryosuke Nagami, Saitama (JP); Takashi Suzuki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/239,383

(22) Filed: Aug. 17, 2016

(65) Prior Publication Data

US 2017/0075089 A1 Mar. 16, 2017

(30) Foreign Application Priority Data

Sep. 11, 2015 (JP) .................................. 2015-179758

(51) Int. Cl.
- *G02B 9/12* (2006.01)
- *G02B 13/00* (2006.01)

(Continued)

(52) U.S. Cl.
CPC ........... *G02B 13/006* (2013.01); *G02B 5/005* (2013.01); *G02B 9/60* (2013.01); *G02B 13/0045* (2013.01)

(58) Field of Classification Search
CPC ........ G02B 13/006; G02B 5/005; G02B 9/60; G02B 13/0045; G02B 13/0035;

(Continued)

(56) References Cited

U.S. PATENT DOCUMENTS

| 4,437,734 A | 3/1984 | Iizuka |
| 5,050,974 A | 9/1991 | Takasugi et al. |

(Continued)

FOREIGN PATENT DOCUMENTS

| JP | S57-041608 A | 3/1982 |
| JP | H02-074912 A | 3/1990 |

(Continued)

OTHER PUBLICATIONS

An Office Action; "Notification of Reasons for Refusal," issued by the Japanese Patent Office dated Jun. 5, 2018, which corresponds to Japanese Patent Application No. 2015-179758 and is related to U.S. Appl. No. 15/239,383; with English language translation.

(Continued)

*Primary Examiner* — Joseph P Martinez
*Assistant Examiner* — Vipin Patel
(74) *Attorney, Agent, or Firm* — Studebaker & Brackett PC

(57) ABSTRACT

An imaging lens includes, in order from the object side to the image side, a positive first lens group, a stop, a positive second lens group, and a positive third lens group. The first lens group includes, consecutively in order from the most object side thereof, a negative lens and a positive lens. The second lens group is of a three lens configuration and includes a positive lens and a negative lens. The third lens group includes, consecutively in order from the most object side thereof, a negative lens and a positive lens. The imaging lens satisfies Conditional Formula (1): 0<f1/f2<2, which is related to the focal length f1 of the first lens group and the focal length f2 of the second lens group.

20 Claims, 9 Drawing Sheets

(51) Int. Cl.
*G02B 5/00* (2006.01)
*G02B 9/60* (2006.01)

(58) Field of Classification Search
CPC ........ G02B 9/12; G02B 13/18; G02B 15/177;
G02B 13/00; G02B 21/02; G02B 21/08;
G02B 15/163; G02B 15/167; G02B
15/173; G02B 15/14
USPC ....... 359/645, 689, 716, 784, 792, 735, 797,
359/755–757, 751, 657, 682
See application file for complete search history.

(56) References Cited

U.S. PATENT DOCUMENTS

| | | | | |
|---|---|---|---|---|
| 5,914,823 | A * | 6/1999 | Yamamoto | G02B 13/143 |
| | | | | 359/749 |
| 8,654,448 | B2 * | 2/2014 | Morooka | G02B 15/163 |
| | | | | 359/676 |
| 2007/0195427 | A1 | 8/2007 | Sugita | |
| 2013/0265648 | A1 | 10/2013 | Saori | |
| 2014/0307333 | A1 | 10/2014 | Kawamura | |
| 2016/0011404 | A1 | 1/2016 | Suzuki | |

FOREIGN PATENT DOCUMENTS

| | | |
|---|---|---|
| JP | H03-078716 A | 4/1991 |
| JP | H06-214157 A | 8/1994 |
| JP | 2000-098222 A | 4/2000 |
| JP | 2002-196234 A | 7/2002 |
| JP | 2007-225877 A | 9/2007 |
| JP | 2008-292718 A | 12/2008 |
| JP | 2010-276892 A | 12/2010 |
| JP | 2012-220654 A | 11/2012 |
| JP | 2013-231941 A | 11/2013 |
| JP | 2014-219587 A | 11/2014 |
| WO | 2013/099214 A1 | 7/2013 |

OTHER PUBLICATIONS

An Office Action mailed by the State Intellectual Property Office of the People's Republic of China dated Jun. 21, 2018, corresponds to Chinese Patent Application No. 201610801563.X and is related to U.S. Appl. No. 15/239,383.

* cited by examiner

EXAMPLE 2

EXAMPLE 3

EXAMPLE 4

IMAGING LENS AND IMAGING APPARATUS

CROSS REFERENCE TO RELATED APPLICATIONS

The present application claims priority under 35 U.S.C. § 119 to Japanese Patent Application No. 2015-179758 filed on Sep. 11, 2015. The above application is hereby expressly incorporated by reference, in its entirety, into the present application.

BACKGROUND

The present disclosure is related to an imaging lens which is favorably suited for use in a digital camera, a video camera, and the like. The present disclosure is also related to an imaging apparatus equipped with such an imaging lens.

In recent years, there are many digital cameras equipped with large imaging devices that comply with the APS format or the four thirds format, for example, are commercially available. Recently, such cameras are not limited to digital single lens reflex cameras, and exchangeable lens digital cameras without reflex finders and compact cameras also employ the aforementioned large imaging devices. The advantages of these cameras are that they are compact as a whole and are highly portable, while enabling imaging at high quality. It is desired for imaging lenses to be mounted on such cameras to be configured to be compact.

Known imaging lenses that achieve miniaturization while being compatible with large imaging elements are disclosed in International Patent Publication No. WO2013/099214 and Japanese Unexamined Patent Publication No. 2014-219587, for example. International Patent Publication No. WO2013/099214 discloses a lens system constituted by, in order from the object side to the image side, a first lens group having three or fewer lenses, a stop, and a second lens group having five or fewer lenses. Japanese Unexamined Patent Publication No. 2014-219587 discloses a lens system constituted by, in order from the object side to the image side, a first lens group having two lenses, a stop, a second lens group having three lenses, and a third lens group having two lenses.

SUMMARY

If a lens system which is not compatible with a large imaging element is simply proportionately enlarged to become compatible with a large imaging element, the total length of the lens system will necessarily become long. Therefore, some contrivance is necessary to configure a lens system such that it is compatible with a large imaging element while shortening the total length thereof. The imaging lenses disclosed in International Patent Publication No. WO2013/099214 and Japanese Unexamined Patent Publication No. 2014-219587 achieve miniaturization while being compatible with large imaging elements. However, recently, there are cases in which further miniaturization is desired. A lens system having an even wider angle of view than those of the imaging lenses disclosed in International Patent Publication No. WO2013/099214 and Japanese Unexamined Patent Publication No. 2014-219587 is desired, in order to configure the lens system to be compatible with a large imaging element while achieving further miniaturization.

The present disclosure has been developed in view of the foregoing circumstances. The present disclosure provides an imaging lens having favorable optical performance, which is compatible with a large imaging element, is compact, and is configured to have a wide angle of view. The present disclosure also provides an imaging apparatus equipped with this imaging lens.

An imaging lens of the present disclosure consists of, in order from the object side to the image side:

a first lens group having a positive refractive power as a whole;

a stop;

a second lens group having a positive refractive power as a whole; and a third lens group having a positive refractive power as a whole;

the first lens group comprising, consecutively in order from the most object side thereof, a negative lens and a positive lens;

the second lens group consisting of three lenses including a positive lens and a negative lens;

the third lens group comprising, consecutively in order from the most object side thereof, a negative lens and a positive lens; and Conditional Formula (1) below being satisfied:

$$0 < f1/f2 < 2 \tag{1}$$

wherein f1 is the focal length of the first lens group, and f2 is the focal length of the second lens group.

In the imaging lens of the present disclosure, it is preferable for Conditional Formula (1-1) below to be further satisfied.

$$0.3 < f1/f2 < 1 \tag{1-1}$$

In addition, in the imaging lens of the present disclosure, it is preferable for at least one of Conditional Formulae (2) through (7) and (2-1) through (7-1) below to be satisfied. Note that preferred aspects include those in which any one of the conditional formulae is satisfied, and those in which arbitrary combinations of the conditional formulae are satisfied.

$$0 < f1/f3 < 0.6 \tag{2}$$

$$0.05 < f1/f3 < 0.3 \tag{2-1}$$

$$-1 < f \cdot \tan \omega / R3f < 1 \tag{3}$$

$$-0.5 < f \cdot \tan \omega / R3f < 0.5 \tag{3-1}$$

$$Nd6 < 1.75 \tag{4}$$

$$Nd6 < 1.7 \tag{4-1}$$

$$0.7 < D12/(f \cdot \tan \omega) < 1 \tag{5}$$

$$0.8 < D12/(f \cdot \tan \omega) < 0.9 \tag{5-1}$$

$$0.35 < \Sigma d/TL < 0.6 \tag{6}$$

$$0.4 < \Sigma d/TL < 0.55 \tag{6-1}$$

$$1.5 < TL/(f \cdot \tan \omega) < 2.4 \tag{7}$$

$$1.7 < TL/(f \cdot \tan \omega) < 2 \tag{7-1}$$

wherein f1 is the focal length of the first lens group, f3 is the focal length of the third lens group, f is the focal length of the entire lens system, ω is the half angle of view, R3f is the radius of curvature of the surface toward the object side of the lens most toward the object side within the third lens group, Nd6 is the refractive index with respect to the d line of the negative lens most toward the object side within the third lens group, D12 is the distance along the optical axis from the lens surface most toward the object side within the first lens group to the lens surface most toward the image side within the second lens group, Σd is the sum of the center thicknesses of all of the lenses, and TL is the sum of the distance along the optical axis from the lens surface most toward the object side to the lens surface most toward the image side and the back focus as an air converted length.

Here, f, ω, and TL are values in a state in which the imaging lens is focused on an object at infinity. Note that ω corresponds to the half value of the maximum angle of view, TL corresponds to the total length of the lens system, and f·tan ω corresponds to the paraxial image height.

In the imaging lens of the present disclosure, the first lens group may be configured to consist of, in order from the object side to the image side, a negative meniscus lens and a positive lens.

In the imaging lens of the present disclosure, the second lens group may be configured to consist of, in order from the object side to the image side, a negative lens, a positive lens, and a negative lens. In addition, it is preferable for the lens surface most toward the object side within the second lens group to be a concave surface, and for the lens surface most toward the image side within the second lens group to be a convex surface.

In the imaging lens of the present disclosure, the third lens group may be configured to consist of, in order from the object side to the image side, a negative lens and a positive lens.

The imaging lens of the present disclosure may be configured such that the third lens group is fixed with respect to an image formation plane while the first lens group, the stop, and the second lens group move integrally during focusing operations.

Note that the expressions "consists of . . . " and "consisting of . . . " refer to essential elements, and means that lenses that practically have no power, optical elements other than lenses such as an aperture stop and a cover glass, and mechanical portions such as lens flanges, a lens barrel, and a camera shake correcting mechanism, may be included as constituent elements in addition to the constituent elements listed above.

Note that the signs of the refractive powers of the lens groups, the signs of the refractive powers of the lenses, the shapes of the surfaces of the lenses, and the values of the radii of curvature are considered in the paraxial regions for aspherical surfaces, if lenses having aspherical surfaces are included. In addition, the signs of the radii of curvature are positive for shapes which are convex toward the object side, and negative for shapes which are convex toward the image side. In addition, the values of each of the above conditional formulae are those related to the d line (wavelength: 587.6 nm).

An imaging apparatus of the present disclosure is equipped with the imaging lens of the present disclosure.

According to the present disclosure, the configurations of the lenses within each of the lens groups are favorably set in a lens system consisting of, in order from the object side to the image side, a positive first lens group, a stop, a positive second lens group, and a positive third lens group, and a predetermined conditional formula is satisfied. Therefore, an imaging lens having favorable optical performance, which is compatible with a large imaging element, is compact, and is configured to have a wide angle of view can be provided. In addition, an imaging aparats equipped with this imaging lens can also be provided.

DETAILED DESCRIPTION OF THE PREFERRED EMBODIMENTS

Figure 1:
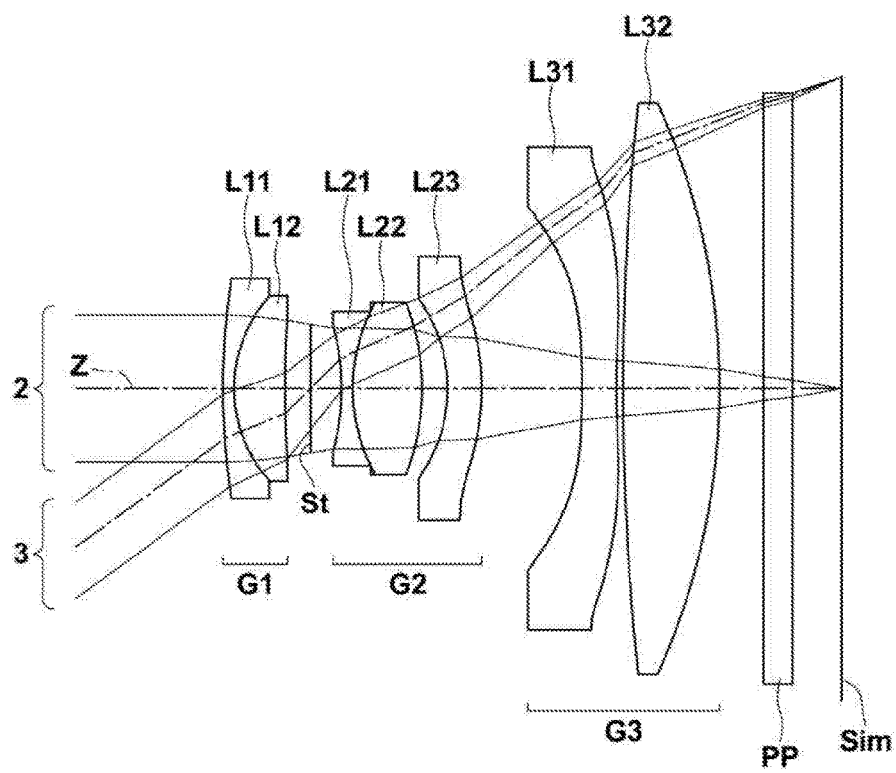
FIG. 1 is a sectional diagram that illustrates the configuration of and the paths of light rays that pass through an imaging lens according to Example 1 of the present disclosure.

Hereinafter, embodiments of the present disclosure will be described in detail with reference to the attached drawings. FIG. 1 through FIG. 4 are cross sectional diagrams that illustrate the configurations of and the paths of light beams that pass through imaging lenses according to embodiments of the present disclosure, which respectively correspond to imaging lenses of Examples 1 through 4 to be described later. The basic configurations of the embodiments illustrated in FIG. 1 through FIG. 4 as well as the manners in which the drawings are illustrated are the same. Therefore, the imaging lenses according to the embodiments of the present disclosure will be described mainly with reference to FIG. 1. In FIG. 1, the left side is the object side and the right side is the image side. FIG. 1 illustrates the optical paths of an axial light beam 2 and an off axis light beam 3 at the maximum angle of view.

This imaging lens is constituted by, in order from the object side to the image side along an optical axis Z: a first lens group G1 having a positive refractive power as a whole; an aperture stop St; a second lens group G2 having a positive refractive power as a whole; and a third lens group G3 having a positive refractive power as a whole. Note that the aperture stop St illustrated in FIG. 1 does not necessarily represent the size or shape thereof, but indicates the position thereof along the optical axis Z.

FIG. 1 illustrates an example in which a parallel plate optical member PP is provided between the lens provided most toward the image side and an image formation plane Sim. The optical member PP is provided assuming the presence of various filters such as an infrared cutoff filter and a low pass filter, as well as a cover glass and the like. However, the position of the optical member PP is not limited to that illustrated in FIG. 1. In addition, a configuration from which the optical member PP is omitted is also possible.

The first lens group G1 is a lens group having a positive refractive power as a whole. This configuration is advantageous from the viewpoint of shortening the total length of the lens system. In addition, the first lens group G1 is configured to have one negative lens and one positive lens, consecutively in this order from the most object side thereof. This configuration is advantageous from the viewpoint of correcting spherical aberration, field curvature, and distortion.

For example, the first lens group G1 may be of a two lens configuration constituted by, in order from the object side to the image side, a negative meniscus lens and a positive lens. In the case that this configuration is adopted, such a configuration is advantageous from the viewpoints of correcting chromatic aberrations and miniaturization. In the case that the first lens group G1 is of the two lens configuration described above, the two lenses may be single lenses or cemented together. In the case that the two lenses are cemented together, such a configuration is more advantageous from the viewpoints of correcting chromatic aberrations and miniaturization, and additionally advantageous from the viewpoint of correcting field curvature. In the example illustrated in FIG. 1, the first lens group G1 is constituted by, in order from the object side to the image side, a lens L11 of a negative meniscus shape with a concave surface toward the image side, and a lens L12 of a positive meniscus shape with a convex surface toward the object side. The lens L11 and the lens L12 are cemented together.

The second lens group G2 is a lens group having a positive refractive power as a whole. This configuration is advantageous from the viewpoint of shortening the total length of the lens system. The second lens group G2 is constituted by three lenses. This configuration is advantageous from the viewpoint of miniaturization. In addition, the second lens group G2 is configured to include one positive lens and one negative lens. This configuration is advantageous from the viewpoint of correcting chromatic aberrations. The second lens group G2 may be configured to have a cemented lens formed by cementing a positive lens and a negative lens together. Such a configuration is advantageous from the viewpoints of correcting chromatic aberrations and miniaturization.

For example, the second lens group G2 may be constituted by, in order from the object side to the image side, a negative lens, a positive lens, and a negative lens. In the case that this configuration is adopted, the first and second lenses from the object side within the second lens group G2 can correct longitudinal chromatic aberration, and the negative lens provided most toward the image side can correct lateral chromatic aberration. In addition, the heights of principal light rays at peripheral angles of view will be higher when passing through the negative lens at the most image side within the second lens group G2 than when passing through the negative lens most toward the object side within the second lens group G2. Therefore, the negative lens most toward the image side within the second lens group G2 can correct astigmatism.

It is preferable for the lens surface most toward the object side within the second lens group G2 to be concave, and for the lens surface most toward the image side within the second lens group G2 to be convex. In the case that this configuration is adopted, off axis light rays being refracted to a great degree can be avoided, and the amount of generated aberrations can be suppressed.

In the example illustrated in FIG. 1, the second lens group G2 is constituted by, in order from the object side to the image side, a lens L21 of a biconcave shape, a lens L22 of a biconvex shape, and a lens L23 of a negative meniscus shape with a concave surface toward the object side in the paraxial region. The lens L21 and the lens L22 are cemented together.

The third lens group G3 is a lens group having a positive refractive power as a whole. This configuration is advantageous from the viewpoint of shortening the total length of the lens system. The third lens group G3 is configured to have, consecutively in order from the most object side thereof, a negative lens and a positive lens. This configuration is advantageous from the viewpoint of correcting field curvature, which is likely to become a problem when the angle of view is widened, and widening the angle of view will be facilitated. Note that the third lens group G3 may be of a two lens configuration constituted by, in order from the object side to the image side, a negative lens and a positive lens. Such a configuration is advantageous from the viewpoints of correcting field curvature and miniaturization.

The third lens group G3 may be configured to include aspherical surfaces. In this case, off axis light rays can be prevented from being refracted to a great degree, facilitating correction of off axis aberrations. As a result, this configuration will be advantageous from the viewpoint of realizing a compact, wide angle imaging lens. In the example illustrated in FIG. 1, the third lens group G3 is constituted by, in order from the object side to the image side, a negative lens L31 which has a concave surface toward the image side in the paraxial region, and a positive lens L32 which has a convex surface toward the object side. Both surfaces of the lens L31 are aspherical surfaces.

In this imaging lens, all of the first lens group G1, the second lens group G2, and the third lens group G3 have positive refractive powers. Therefore, the positive refractive power of the imaging lens can be distributed among all of the lens groups, which is advantageous from the viewpoints of correcting aberrations and shortening the total length of the lens system. Particularly, the second lens group G2 being a positive lens group of a three lens configuration and the third lens group G3 being a positive lens group having, in order from the most object side thereof, the negative lens and the positive lens is advantageous from the viewpoint of realizing an imaging lens that achieves a widening of the angle of view and miniaturization, while maintaining high optical performance.

This imaging lens is configured such that Conditional Formula (1) below is satisfied.

$$0 < f1/f2 < 2 \quad (1)$$

wherein f1 is the focal length of the first lens group, and f2 is the focal length of the second lens group.

The lower limit of Conditional Formula (1) is 0, because the first lens group G1 and the second lens group G2 are positive lens groups. In other words, it is necessary for the value of f1/f2 to be greater than the lower limit of Conditional Formula (1) in order for the positive refractive power to be distributed. Configuring the imaging lens such that the value of f1/f2 is not greater than or equal to the upper limit defined in Conditional Formula (1) is advantageous from the viewpoint of shortening the total length of the lens system. In addition, achieving a balanced distribution of refractive powers between the first lens group G1 and the second lens group G2 is facilitated, which is advantageous from the viewpoint of favorably correcting aberrations. It is particularly important for the refractive powers of the first lens group G1 and the second lens group G2, which are the first and second lens groups from the object side within the entire lens system with the aperture stop St positioned therebetween, to be balanced.

Further, it is preferable for Conditional Formula (1-1) below to be satisfied.

$$0.3 < f1/f2 < 1 \tag{1-1}$$

Configuring the imaging lens such that the value of f1/f2 is not less than or equal to the lower limit defined in Conditional Formula (1-1) facilitates achieving a balance of refractive powers of the first lens group G1 and the second lens group G2, which is advantageous from the viewpoint of favorably correcting aberrations. By configuring the imaging lens such that the value of f1/f2 is not greater than or equal to the upper limit defined in Conditional Formula (1-1), the advantageous effects related to the upper limit of Conditional Formula (1) will become more prominent.

In addition, it is preferable for Conditional Formula (2) below to be satisfied in this imaging lens.

$$0 < f1/f3 < 0.6 \tag{2}$$

wherein f1 is the focal length of the first lens group, and f3 is the focal length of the third lens group.

The lower limit of Conditional Formula (2) is 0, because the first lens group G1 and the third lens group G3 are positive lens groups. In other words, it is necessary for the value of f1/f3 to be greater than the lower limit of Conditional Formula (2) in order for the positive refractive power to be distributed. Configuring the imaging lens such that the value of f1/f3 is not greater than or equal to the upper limit defined in Conditional Formula (2) is advantageous from the viewpoint of shortening the total length of the lens system. In addition, achieving a balanced distribution of refractive powers between the first lens group G1 and the third lens group G3 is facilitated, which is advantageous from the viewpoint of favorably correcting aberrations. Further, by configuring the imaging lens such that the value of f1/f3 is not greater than or equal to the upper limit defined in Conditional Formula (2), the refractive power of the third lens group G3, which is spaced remote from the aperture stop St, can be limited. Thereby, changes in aberrations caused by changes in object distance can be suppressed.

Further, it is preferable for Conditional Formula (2-1) below to be satisfied.

$$0.05 < f1/f3 < 0.3 \tag{2-1}$$

Configuring the imaging lens such that the value of f1/f3 is not less than or equal to the lower limit defined in Conditional Formula (2-1) facilitates achieving a balance of refractive powers of the first lens group G1 and the third lens group G3, which is advantageous from the viewpoint of favorably correcting aberrations. By configuring the imaging lens such that the value of f1/f3 is not greater than or equal to the upper limit defined in Conditional Formula (2-1), the advantageous effects related to the upper limit of Conditional Formula (2) will become more prominent.

In addition, it is preferable for Conditional Formula (3) below to be satisfied in this imaging lens.

$$-1 < f \cdot \tan \omega / R3f < 1 \tag{3}$$

wherein f is the focal length of the entire lens system, $\omega$ is the half angle of view, and R3f is the radius of curvature of the surface toward the object side of the lens most toward the object side within the third lens group.

By Conditional Formula (3) being satisfied, the absolute value of the radius of curvature of the lens surface most toward the object side within the third lens group can be prevented from becoming excessively small, which is advantageous from the viewpoint of shortening the total length of the lens system. It is more preferable for Conditional Formula (3-1) below to be satisfied, in order to cause the advantageous effects related to Conditional Formula (3) to become more prominent.

$$-0.5 < f \cdot \tan \omega / R3f < 0.5 \tag{3-1}$$

In addition, it is preferable for Conditional Formula (4) below to be satisfied in this imaging lens.

$$Nd6 < 1.75 \tag{4}$$

wherein Nd6 is the refractive index with respect to the d line of the negative lens most toward the object side within the third lens group.

By Conditional Formula (4) being satisfied, the refractive index of the negative lens most toward the object side within the third lens group G3 can be suppressed, and maintaining the refractive power of the third lens group G3 as a whole to be positive is facilitated. Configuring all three lens groups to be positive lenses is advantageous from the viewpoints of miniaturization in the radial direction and shortening the total length of the lens system. In addition, Conditional Formula (4) being satisfied is advantageous form the viewpoint of correcting field curvature. It is more preferable for Conditional Formula (4-1) below to be satisfied, in order to cause the advantageous effects related to Conditional Formula (4) to become more prominent. Further, it is even more preferable for Conditional Formulae (4-2) and (4-3) to be satisfied.

$$Nd6 < 1.7 \tag{4-1}$$

$$1.52 < Nd6 < 1.75 \tag{4-2}$$

$$1.54 < Nd6 < 1.7 \tag{4-3}$$

Configuring the imaging lens such that the value of Nd6 is not less than or equal to the lower limit defined in Conditional Formula (4-2) is advantageous from the viewpoint of suppressing spherical aberration. Configuring the imaging lens such that the value of Nd6 is not less than or equal to the lower limit defined in Conditional Formula (4-3) is further advantageous from the viewpoint of suppressing spherical aberration.

In addition, it is preferable for Conditional Formula (5) below to be satisfied in this imaging lens.

$$0.7 < D12/(f \cdot \tan \omega) < 1 \tag{5}$$

wherein D12 is the distance along the optical axis from the lens surface most toward the object side within the first lens group to the lens surface most toward the image side within the second lens group, f is the focal length of the entire lens system, and $\omega$ is the half angle of view.

By configuring the imaging lens such that the value of D12/(f·tan $\omega$) is not less than or equal to the lower limit defined in Conditional Formula (5), a sufficient amount of space in which to provide the lenses of the first lens group G1 and the second lens group G2, as well as the aperture stop St in order to perform favorable correction of aberrations, can be secured. By configuring the imaging lens such that the value of D12/(f·tan ω) is not greater than or equal to the upper limit defined in Conditional Formula (5), the length in the direction of the optical axis from the first lens group G1 and the second lens group G2 can be suppressed, which is advantageous from the viewpoint of shortening the total length of the lens system. It is more preferable for Conditional Formula (5-1) below to be satisfied, in order to cause the advantageous effects related to Conditional Formula (5) to become more prominent.

$$0.8 < D12/(f \cdot \tan \omega) < 0.9 \qquad (5\text{-}1)$$

In addition, it is preferable for Conditional Formula (6) below to be satisfied in this imaging lens.

$$0.35 < \Sigma d/TL < 0.6 \qquad (6)$$

wherein Σd is the sum of the center thicknesses of all of the lenses, and TL is the sum of the distance along the optical axis from the lens surface most toward the object side to the lens surface most toward the image side and the back focus as an air converted length.

Conditional Formula (6) defines a preferable range of the percentage of the length along the optical axis which is occupied by the lenses within the total length of the lens system. By configuring the imaging lens such that the value of Σd/TL is not less than or equal to the lower limit defined in Conditional Formula (6), a sufficient percentage of the length along the optical axis which is occupied by the lenses can be secured, and favorable correction of aberrations will be facilitated. By configuring the imaging lens such that the value of Σd/TL is not greater than or equal to the upper limit defined in Conditional Formula (6), the percentage of the length along the optical axis which is occupied by the lenses will not become excessively great. As a result, the entirety of the lens system can be prevented from becoming heavy. It is more preferable for Conditional Formula (6-1) below to be satisfied, in order to cause the advantageous effects related to Conditional Formula (6) to become more prominent.

$$0.4 < \Sigma d/TL < 0.55 \qquad (6\text{-}1)$$

In addition, it is preferable for Conditional Formula (7) below to be satisfied in this imaging lens.

$$1.5 < TL/(f \cdot \tan \omega) < 2.4 \qquad (7)$$

wherein TL is the sum of the distance along the optical axis from the lens surface most toward the object side to the lens surface most toward the image side and the back focus as an air converted length, f is the focal length of the entire lens system, and ω is the half angle of view.

By configuring the imaging lens such that the value of TL/(f·tan ω) is not less than or equal to the lower limit defined in Conditional Formula (7), correction of spherical aberration and field curvature will be facilitated. By configuring the imaging lens such that the value of TL/(f·tan ω) is not greater than or equal to the upper limit defined in Conditional Formula (7), an increase in the total length of the lens system can be suppressed, and configuring the lens system to be compact is facilitated. Thereby the apparatus becoming large can be avoided. It is more preferable for Conditional Formula (7-1) below to be satisfied, in order to cause the advantageous effects related to Conditional Formula (7) to become more prominent.

$$1.7 < TL/(f \cdot \tan \omega) < 2 \qquad (7\text{-}1)$$

Note that this imaging lens may be configured such that a portion of the lens groups is moved to perform focusing operations. For example, the imaging lens may be configured such that the third lens group G3 is fixed with respect to the image formation plane Sim while the first lens group G1, the aperture stop St, and the second lens group G2 move integrally during focusing operations. In the case that this configuration is adopted, the amount of driving movement can be decreased compared to that of a lens system that adopts the rear focus method, which is advantageous from the viewpoint of miniaturization of the apparatus.

Arbitrary combinations of the preferable configurations and possible configurations described above, including the configurations related to the conditional formula are possible. It is preferable for these configurations to be selected as appropriate according to desired specifications. For example, it is possible to realize an imaging lens having favorable optical performance, which is compatible with a large imaging element, is compact, and is configured to have a wide angle of view, by adopting the above configurations as appropriate, for example. Note that here, "compact" means that the value of TL/(f·tan ω) described above is less than 2.4. In addition, "wide angle of view" means that the full angle of view is 70° or greater.

Next, Examples of the imaging lens of the present disclosure, and particularly examples of numerical values, will be described in detail.

EXAMPLE 1

The lens configuration and the paths of light rays through the imaging lens of Example 1 are illustrated in FIG. 1. Note that the configurations of the lenses and the manner in which they are illustrated have been described previously. Therefore, redundant descriptions will be omitted below.

Basic lens data are shown in Table 1, various items are shown in Table 2, and aspherical surface coefficients are shown in Table 3 for the imaging lens of Example 1. In Table 1, ith (i=1, 2, 3, . . . ) surface numbers that sequentially increase toward the image side with the surface toward the object side of the constituent element most toward the object side being designated as 1 are listed in the column Si; the radii of curvature of ith surfaces are listed in the column Ri; and distances along the optical axis Z between an ith surface and an i+1st surface are listed in the column Di. In addition, the refractive indices with respect to the d line (wavelength: 587.6 nm) of jth (j=1, 2, 3, . . . ) constituent elements, j being the number of constituent elements with the constituent element most toward the object side designated as 1 and sequentially increasing toward the eye point side, are listed in the column Ndj; and the Abbe's numbers with respect to the d line of jth constituent elements are listed in the column vdj.

Here, the signs of the radii of curvature are positive for surface shapes which are convex toward the object side, and negative for surface shapes which are convex toward the image side. Table 1 also show the aperture stop St and the optical member PP. In Table 1, a surface number and text reading "(St)" is shown in the column of surface numbers for the row of the surface that corresponds to the aperture stop St. The value of the bottommost row in the column Di is the distance between the surface most toward the image side within the table and the image formation plane Sim. Note that the values shown in Table 1 are those for a state in which the imaging lens is focused on an object at infinity.

Table 2 shows the focal length f of the entire lens system, the back focus Bf as an air converted length, the F number F No., the maximum full angle of view 2ω, and the total length TL (the sum of the distance from the lens surface most toward the object side to the lens surface most toward the image side and the back focus as an air converted length). The indication "(°)" in the row for "2ω" means that degrees are employed as units. The values shown in Table 2 those that employ the d line as a reference, in a state focused on an object at infinity.

In the lens data of Table 1, surface numbers of aspherical surfaces are denoted with the mark "*", and numerical values that represent paraxial radii of curvature are shown as the radii of curvature of the aspherical surfaces. Table 3 shows aspherical surface data of the imaging lens of Example 1. In the numerical values of the aspherical surface coefficients of Table 3, "E-n (n: integer)" means "×10$^{-n}$". Note that the aspherical surface coefficients are the values of the coefficients KA and Am (m=3, 4, 5, . . . , 20) in the aspherical surface formula below.

$$Zd = \frac{C \times h^2}{1 + \sqrt{1 - KA \times C^2 \times h^2}} + \sum_m Am \times h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the paraxial curvature, and KA and Am are aspherical surface coefficients (m=3, 4, 5, . . . , 20).

For the data in the tables below, mm is used as the units for lengths and degrees (°) are used as units of angles. However, it is possible for optical systems to be proportionately enlarged or proportionately reduced and utilized. Therefore, other appropriate units may be used. In addition, the tables below show numerical values which are rounded off at a predetermined number of digits.

TABLE 1

Example 1

| Si | Ri | Di | Ndj | vdj |
|---|---|---|---|---|
| 1 | 33.66700 | 0.500 | 1.59270 | 35.31 |
| 2 | 6.36500 | 2.280 | 1.88300 | 40.76 |
| 3 | 51.96200 | 1.140 | | |
| 4 (St) | ∞ | 1.400 | | |
| 5 | −10.75200 | 0.500 | 1.69895 | 30.13 |
| 6 | 8.04000 | 3.110 | 1.88300 | 40.76 |
| 7 | −10.93100 | 1.170 | | |
| *8 | −6.79295 | 1.550 | 1.56867 | 58.50 |
| *9 | −10.81559 | 4.493 | | |
| *10 | −39.36209 | 1.550 | 1.68201 | 31.43 |
| *11 | 58.13827 | 0.300 | | |
| 12 | 124.77000 | 4.320 | 1.88300 | 40.76 |
| 13 | −31.86900 | 2.000 | | |
| 14 | ∞ | 1.300 | 1.49784 | 54.98 |
| 15 | ∞ | 2.225 | | |

TABLE 2

Example 1

| | |
|---|---|
| f | 19.129 |
| Bf | 5.092 |
| F No. | 2.88 |
| 2ω (°) | 72.8 |
| TL | 27.405 |

TABLE 3

Example 1

| Surface Number | 8 | 9 | 10 | 11 |
|---|---|---|---|---|
| KA | 0.0000000E+00 | 0.0000000E+00 | 0.0000000E+00 | 0.0000000E+00 |
| A3 | 1.3782299E−03 | 1.6676754E−03 | 7.1558711E−03 | 5.5995896E−03 |
| A4 | −3.9906529E−03 | −2.4750326E−03 | −4.5021273E−03 | −2.8612644E−03 |
| A5 | 3.0279366E−03 | 1.2407224E−03 | 5.5943157E−04 | 1.4221896E−04 |
| A6 | −7.2335607E−04 | −2.8344250E−05 | 1.8141289E−04 | 1.3246894E−04 |
| A7 | −5.2662171E−04 | −1.8838124E−04 | −6.8061703E−05 | −2.6896787E−05 |
| A8 | 4.3174050E−04 | 5.2306441E−05 | 7.9699513E−07 | −1.3966448E−06 |
| A9 | −1.0667147E−04 | 7.3270033E−06 | 2.4057863E−06 | 8.5583589E−07 |
| A10 | −2.6123249E−05 | −5.7426490E−06 | −1.9151359E−07 | −3.0874398E−08 |
| A11 | 3.1013165E−05 | 6.1758754E−07 | −4.5583276E−08 | −1.2225967E−08 |
| A12 | −7.7837347E−06 | 2.4398960E−07 | 5.3485862E−09 | 9.4461070E−10 |
| A13 | −1.7599849E−06 | −7.3886864E−08 | 5.5459375E−10 | 8.3855914E−11 |
| A14 | 1.2281672E−06 | −1.4360895E−09 | −8.1148605E−11 | −9.9278279E−12 |
| A15 | −9.1395399E−08 | 2.9375274E−09 | −4.5531991E−12 | −1.6287784E−13 |
| A16 | −6.0784881E−08 | −1.9017547E−10 | 7.6779070E−13 | 4.3963915E−14 |
| A17 | 1.2422264E−08 | −5.5363331E−11 | 2.2470633E−14 | −6.9690143E−16 |
| A18 | 5.0707140E−10 | 5.8994028E−12 | −4.1664211E−15 | −6.2998485E−17 |
| A19 | −3.2671505E−10 | 3.9589140E−13 | −4.9469722E−17 | 3.2617438E−18 |
| A20 | 2.3730773E−11 | −5.2542757E−14 | 9.7697856E−18 | −8.4650758E−20 |

Figure 5:
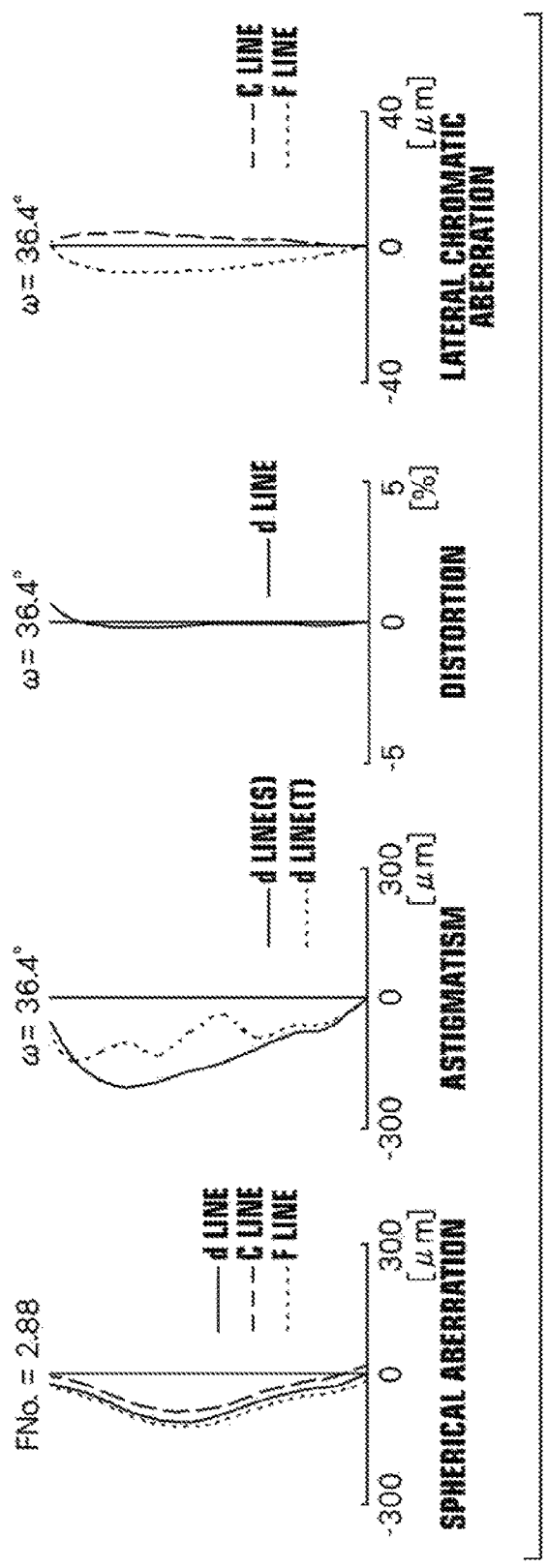
FIG. 5 is a collection of diagrams that illustrate various aberrations of the imaging lens of Example 1, which are spherical aberration, astigmatism, distortion, and lateral aberration in this order from the left side of the drawing sheet.

FIG. 5 is a collection of diagrams that illustrate various aberrations of the imaging lens of Example 1 in a state focused on an object at infinity. The aberration diagrams of FIG. 5 illustrate spherical aberration, astigmatism, distortion, and lateral chromatic aberration (chromatic aberration of magnification) in this order from the left side to the right side of the drawing sheet. The diagram that illustrates spherical aberration shows aberrations related to the d line (wavelength: 587.6 nm), the C line (wavelength: 656.3 nm), and the F line (wavelength: 486.1 nm), as a solid line, a long broken line, and a short broken line, respectively. In the diagram that illustrates astigmatism, aberrations in the sagittal direction and aberrations in the tangential direction related to the d line are indicated by a solid line and a broken line, respectively. In the diagram that illustrates distortion, aberrations related to the d line are shown as a solid line. In the diagram that illustrates lateral chromatic diagram, aberrations related to the C line and the F line are shown as a long broken line and a short broken line, respectively. In the diagram that illustrates spherical aberration, "FNo." denotes the F number. In the other diagrams that illustrate the aberrations, ω denotes half angles of view.

The symbols, the meanings, and the manners in which the various pieces of data are described in the description of Example 1 above are the same for the examples to be described below unless otherwise noted. Therefore, redundant descriptions will be omitted hereinafter.

EXAMPLE 2

Figure 2:
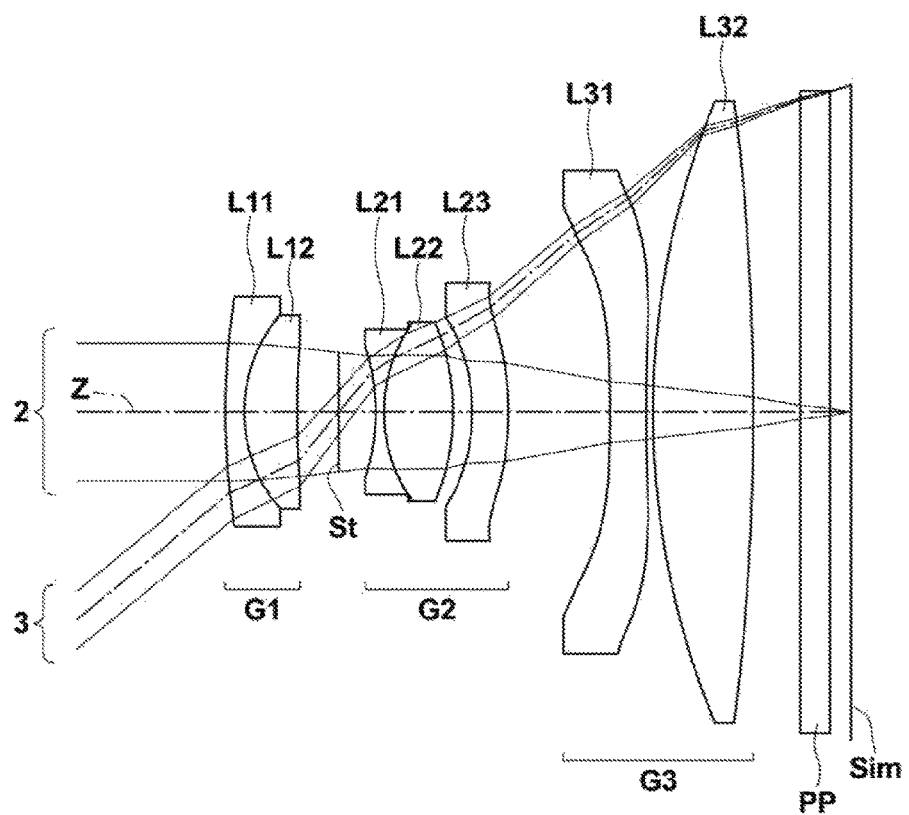
FIG. 2 is a sectional diagram that illustrates the configuration of and the paths of light rays that pass through an imaging lens according to Example 2 of the present disclosure.
Figure 6:
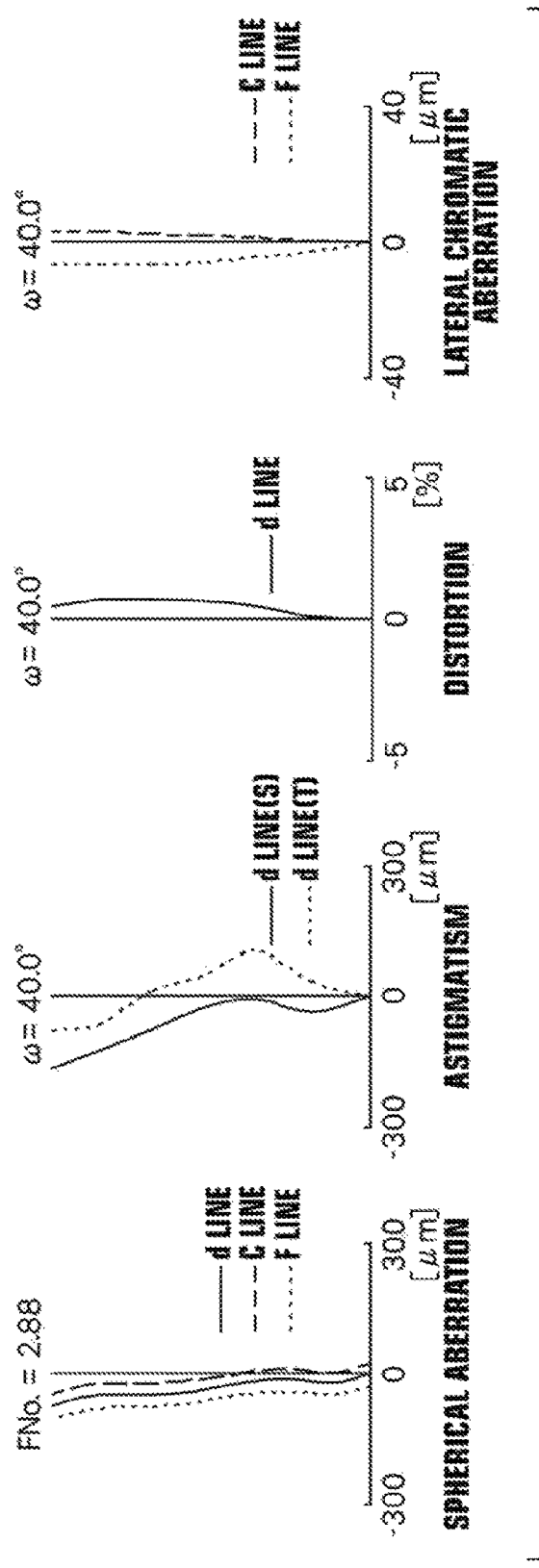
FIG. 6 is a collection of diagrams that illustrate various aberrations of the imaging lens of Example 2, which are spherical aberration, astigmatism, distortion, and lateral aberration in this order from the left side of the drawing sheet.

The lens configuration and the paths of light rays that pass through an imaging lens of Example 2 are illustrated in FIG. 2. Basic lens data are shown in Table 4, various items are shown in Table 5, aspherical surface coefficients are shown in Table 6, and various diagrams that illustrate aberrations in a state focused on an object at infinity are shown in FIG. 6 for the imaging lens of Example 2.

TABLE 4

Example 2

| Si | Ri | Di | Ndj | νdj |
|---|---|---|---|---|
| 1 | 33.04682 | 0.799 | 1.65985 | 32.88 |
| 2 | 6.51726 | 2.273 | 1.89725 | 40.09 |
| 3 | 42.89811 | 1.772 | | |
| 4 (St) | ∞ | 1.585 | | |
| 5 | −9.22076 | 0.355 | 1.65958 | 32.89 |
| 6 | 6.75244 | 2.959 | 1.88791 | 40.87 |
| 7 | −10.27358 | 0.849 | | |
| *8 | −9.70997 | 1.550 | 1.56867 | 58.50 |
| *9 | −15.23656 | 4.346 | | |
| *10 | −61.35877 | 1.550 | 1.68201 | 31.43 |
| *11 | 108.27767 | 0.300 | | |
| 12 | 35.59856 | 4.320 | 1.54296 | 64.99 |
| 13 | −108.10058 | 2.000 | | |
| 14 | ∞ | 1.300 | 1.49784 | 54.98 |
| 15 | ∞ | 0.896 | | |

TABLE 5

Example 2

| | |
|---|---|
| f | 17.220 |
| Bf | 3.764 |
| F No. | 2.88 |
| 2ω (°) | 80.0 |
| TL | 26.422 |

TABLE 6

Example 2

| Surface Number | 8 | 9 | 10 | 11 |
|---|---|---|---|---|
| KA | 0.0000000E+00 | 0.0000000E+00 | 0.0000000E+00 | 0.0000000E+00 |
| A3 | 1.3782299E−03 | 1.6676754E−03 | 7.1558711E−03 | 5.5995896E−03 |
| A4 | −5.2704746E−03 | −3.3057910E−03 | −4.4459561E−03 | −2.4147182E−03 |
| A5 | 3.2562061E−03 | 1.2674642E−03 | 6.4303881E−04 | 1.0046269E−04 |
| A6 | −7.3453167E−04 | −1.7227930E−05 | 1.7054825E−04 | 1.3210911E−04 |
| A7 | −5.3154730E−04 | −1.8816678E−04 | −6.8588766E−05 | −2.6945711E−05 |
| A8 | 4.3143664E−04 | 5.2122875E−05 | 8.1708506E−07 | −1.4017780E−06 |
| A9 | −1.0661512E−04 | 7.3067644E−06 | 2.4068874E−06 | 8.5597722E−07 |
| A10 | −2.6101993E−05 | −5.7435366E−06 | −1.9119689E−07 | −3.0793305E−08 |
| A11 | 3.1014344E−05 | 6.1784788E−07 | −4.5565812E−08 | −1.2220938E−08 |
| A12 | −7.7843494E−06 | 2.4421585E−07 | 5.3556234E−09 | 9.4511872E−10 |
| A13 | −1.7598526E−06 | −7.3846731E−08 | 5.5520932E−10 | 8.3880499E−11 |
| A14 | 1.2282003E−06 | −1.4281926E−09 | −8.1079002E−11 | −9.9266940E−12 |
| A15 | −9.1400111E−08 | 2.9383168E−09 | −4.5666182E−12 | −1.6324147E−13 |
| A16 | −6.0780749E−08 | −1.9017262E−10 | 7.6613099E−13 | 4.3910479E−14 |
| A17 | 1.2422185E−08 | −5.5392610E−11 | 2.2543952E−14 | −7.0076669E−16 |
| A18 | 5.0715494E−10 | 5.8931351E−12 | −4.1566794E−15 | −6.5763255E−17 |
| A19 | −3.2670990E−10 | 3.9500901E−13 | −5.1407856E−17 | 3.7685905E−18 |
| A20 | 2.3715117E−11 | −5.2537361E−14 | 9.8548274E−18 | −1.0414383E−19 |

EXAMPLE 3

Figure 3:
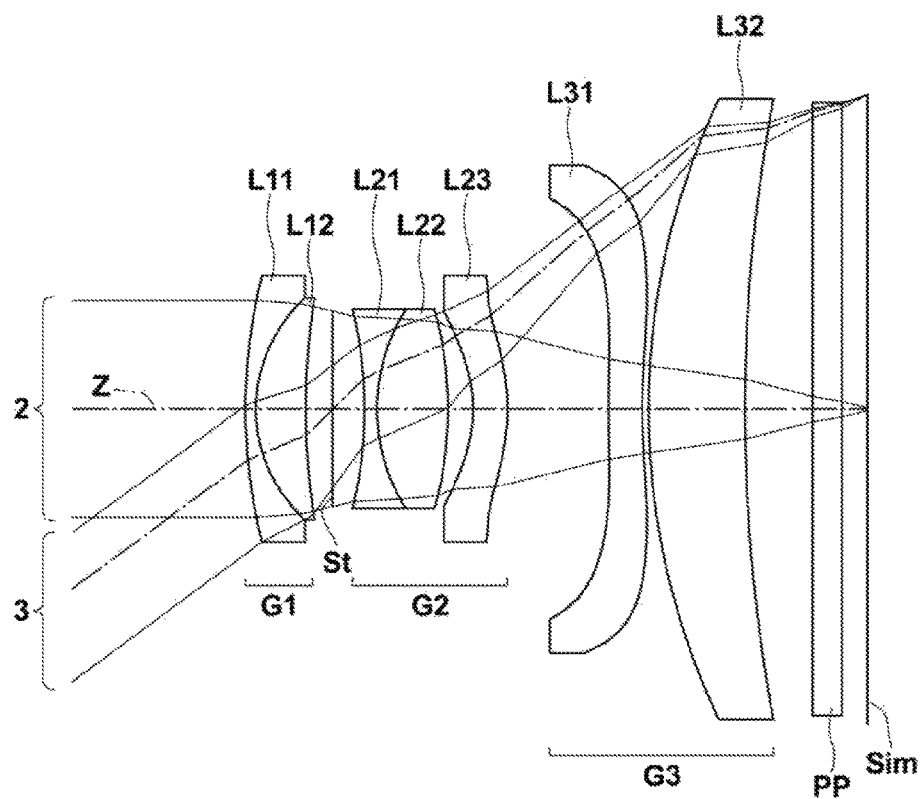
FIG. 3 is a sectional diagram that illustrates the configuration of and the paths of light rays that pass through an imaging lens according to Example 3 of the present disclosure.
Figure 7:
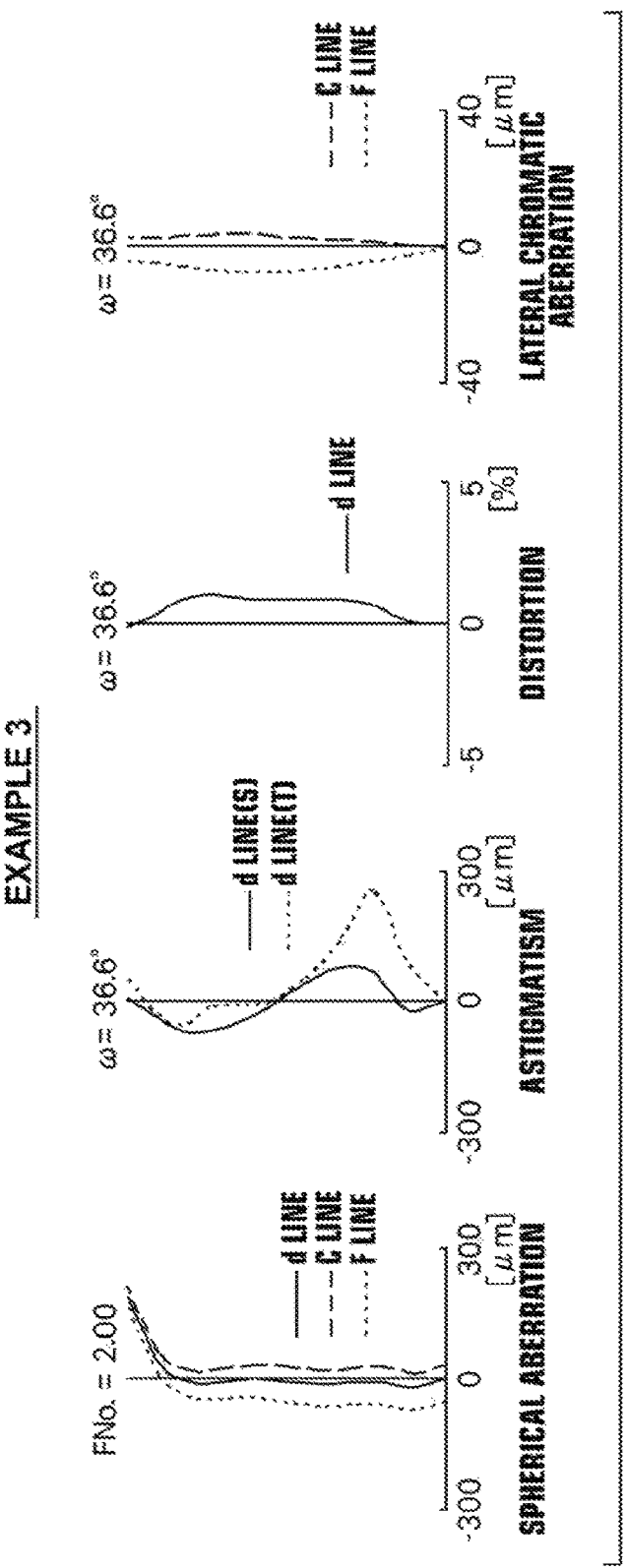
FIG. 7 is a collection of diagrams that illustrate various aberrations of the imaging lens of Example 3, which are spherical aberration, astigmatism, distortion, and lateral aberration in this order from the left side of the drawing sheet.

The lens configuration and the paths of light rays that pass through an imaging lens of Example 3 are illustrated in FIG. 3. Basic lens data are shown in Table 7, various items are shown in Table 8, aspherical surface coefficients are shown in Table 9, and various diagrams that illustrate aberrations in a state focused on an object at infinity are shown in FIG. 7 for the imaging lens of Example 3.

TABLE 7

Example 3

| Si | Ri | Di | Ndj | vdj |
|---|---|---|---|---|
| 1 | 25.17427 | 0.460 | 1.59270 | 35.31 |
| 2 | 6.80509 | 2.219 | 1.88300 | 40.76 |
| 3 | 32.79840 | 1.188 | | |
| 4 (St) | ∞ | 1.425 | | |
| 5 | −19.11103 | 0.555 | 1.69895 | 30.13 |
| 6 | 8.50562 | 3.150 | 1.88300 | 40.76 |
| 7 | −17.36920 | 1.150 | | |
| *8 | −6.54879 | 1.542 | 1.56867 | 58.50 |
| *9 | −9.44298 | 4.497 | | |
| *10 | 80.82271 | 1.500 | 1.68201 | 31.43 |
| *11 | 34.16046 | 0.281 | | |
| 12 | 32.80578 | 4.320 | 1.88300 | 40.76 |
| 13 | 77.88003 | 3.000 | | |
| 14 | ∞ | 1.300 | 1.49784 | 54.98 |
| 15 | ∞ | 1.159 | | |

TABLE 8

Example 3

| | |
|---|---|
| f | 19.146 |
| Bf | 5.027 |
| F No. | 2.00 |
| 2ω (°) | 73.2 |
| TL | 27.314 |

TABLE 9

Example 3

| Surface Number | 8 | 9 | 10 | 11 |
|---|---|---|---|---|
| KA | 0.0000000E+00 | 0.0000000E+00 | 0.0000000E+00 | 0.0000000E+00 |
| A3 | 1.3782299E−03 | 1.6676754E−03 | 7.1558711E−03 | 5.5995896E−03 |
| A4 | −3.6997291E−03 | −1.8335552E−03 | −4.8021486E−03 | −2.8094446E−03 |
| A5 | 3.3681619E−03 | 1.1748850E−03 | 7.1422544E−04 | 1.4207462E−04 |
| A6 | −7.5986859E−04 | −1.2035532E−05 | 1.6874481E−04 | 1.3115271E−04 |
| A7 | −5.3532224E−04 | −1.8794551E−04 | −6.9018764E−05 | −2.6803727E−05 |
| A8 | 4.3160944E−04 | 5.1789320E−05 | 8.1274057E−07 | −1.3953091E−06 |
| A9 | −1.0650521E−04 | 7.2448503E−06 | 2.4123158E−06 | 8.5543702E−07 |
| A10 | −2.6087214E−05 | −5.7510225E−06 | −1.9081862E−07 | −3.0913949E−08 |
| A11 | 3.1009563E−05 | 6.1824664E−07 | −4.5534305E−08 | −1.2229615E−08 |
| A12 | −7.7830763E−06 | 2.4433370E−07 | 5.3486267E−09 | 9.4454276E−10 |
| A13 | −1.7600284E−06 | −7.3809381E−08 | 5.5415356E−10 | 8.3877411E−11 |
| A14 | 1.2281032E−06 | −1.4270243E−09 | −8.1215531E−11 | −9.9256894E−12 |
| A15 | −9.1421069E−08 | 2.9376492E−09 | −4.5610356E−12 | −1.6272599E−13 |
| A16 | −6.0783155E−08 | −1.9038881E−10 | 7.6746496E−13 | 4.3974610E−14 |
| A17 | 1.2422757E−08 | −5.5421623E−11 | 2.2461072E−14 | −6.9589357E−16 |
| A18 | 5.0752964E−10 | 5.8875105E−12 | −4.1642606E−15 | −6.3239958E−17 |
| A19 | −3.2668466E−10 | 3.9622560E−13 | −4.9134821E−17 | 3.2487669E−18 |
| A20 | 2.3708789E−11 | −5.2236758E−14 | 9.8228500E−18 | −8.5354671E−20 |

EXAMPLE 4

Figure 4:
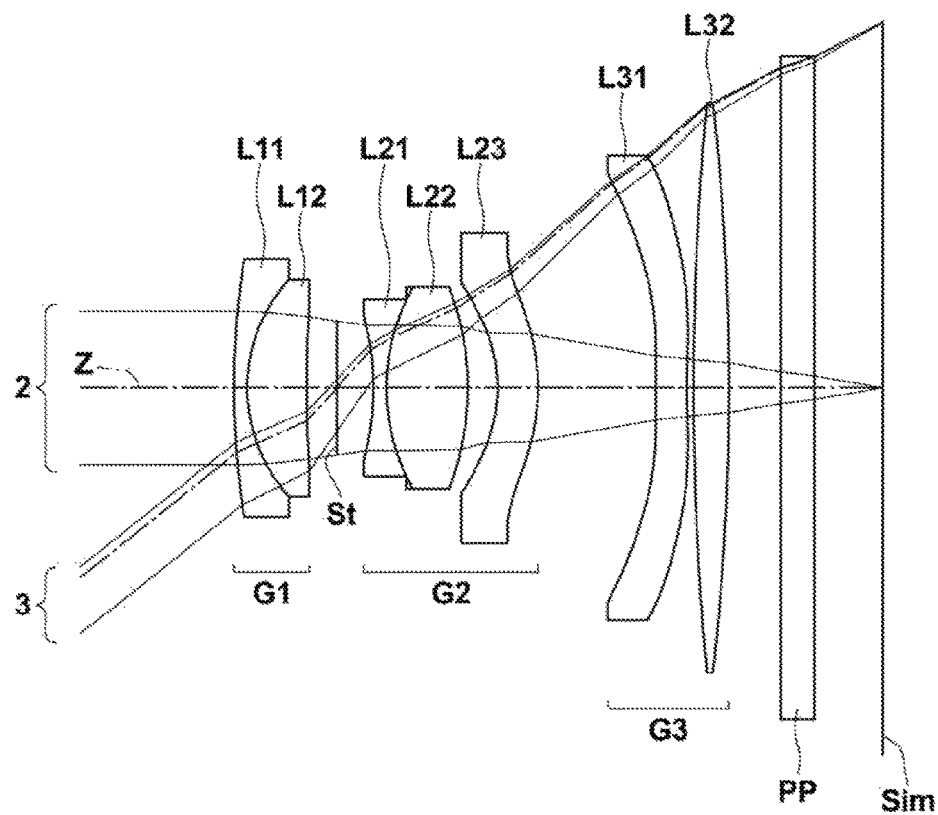
FIG. 4 is a sectional diagram that illustrates the configuration of and the paths of light rays that pass through an imaging lens according to Example 4 of the present disclosure.
Figure 8:
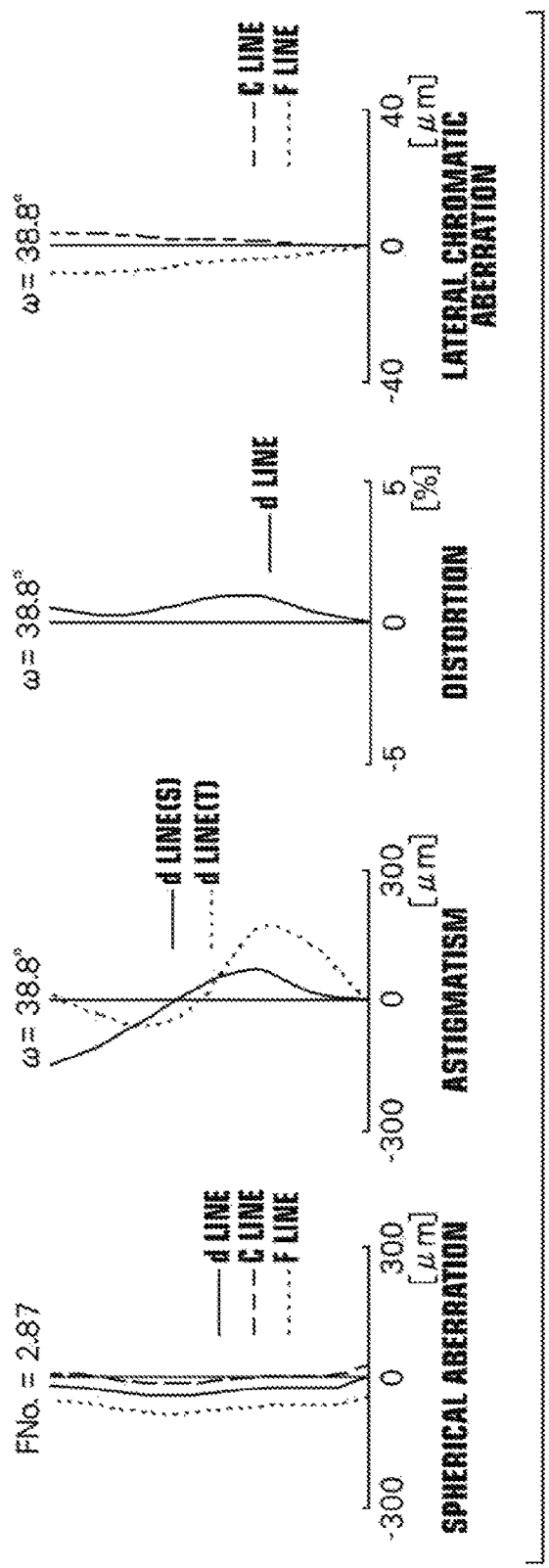
FIG. 8 is a collection of diagrams that illustrate various aberrations of the imaging lens of Example 4, which are spherical aberration, astigmatism, distortion, and lateral aberration in this order from the left side of the drawing sheet.

The lens configuration and the paths of light rays that pass through an imaging lens of Example 4 are illustrated in FIG. 4. Basic lens data are shown in Table 10, various items are shown in Table 11, aspherical surface coefficients are shown in Table 12, and various diagrams that illustrate aberrations in a state focused on an object at infinity are shown in FIG. 8 for the imaging lens of Example 4.

TABLE 10

Example 4

| Si | Ri | Di | Ndj | vdj |
|---|---|---|---|---|
| 1 | 33.66700 | 0.500 | 1.59270 | 35.31 |
| 2 | 6.36500 | 2.280 | 1.88300 | 40.76 |
| 3 | 51.96200 | 1.140 | | |
| 4 (St) | ∞ | 1.400 | | |
| 5 | −10.75200 | 0.500 | 1.69895 | 30.13 |
| 6 | 8.04000 | 3.110 | 1.88300 | 40.76 |
| 7 | −10.93100 | 1.170 | | |
| *8 | −5.94573 | 1.550 | 1.56867 | 58.50 |
| *9 | −8.24153 | 4.493 | | |
| *10 | 258.28672 | 1.201 | 1.68201 | 31.43 |
| *11 | 49.52891 | 0.249 | | |
| 12 | 120.66350 | 1.350 | 1.88300 | 40.76 |
| 13 | −100.00000 | 2.000 | | |
| 14 | ∞ | 1.300 | 1.49784 | 54.98 |
| 15 | ∞ | 2.613 | | |

TABLE 11

Example 4

| | |
|---|---|
| f | 16.978 |
| Bf | 5.481 |
| F No. | 2.87 |
| 2ω (°) | 77.6 |
| TL | 24.424 |

TABLE 12

Example 4

| Surface Number | 8 | 9 | 10 | 11 |
|---|---|---|---|---|
| KA | 0.0000000E+00 | 0.0000000E+00 | 0.0000000E+00 | 0.0000000E+00 |
| A3 | 2.2861522E−03 | 2.0691587E−03 | 4.8771996E−03 | 3.8734129E−03 |
| A4 | −4.9949435E−03 | −3.0008130E−03 | −5.4214725E−03 | −3.3186465E−03 |
| A5 | 3.3483386E−03 | 1.3122157E−03 | 7.6294110E−04 | 1.5175402E−04 |
| A6 | −7.5015518E−04 | −6.5288011E−06 | 1.8556499E−04 | 1.4610124E−04 |
| A7 | −5.1750522E−04 | −1.8624413E−04 | −6.9206783E−05 | −2.6560802E−05 |
| A8 | 4.2983910E−04 | 5.1647792E−05 | 6.8919389E−07 | −1.4902317E−06 |
| A9 | −1.0672695E−04 | 7.2025229E−06 | 2.4062138E−06 | 8.3140486E−07 |
| A10 | −2.6097596E−05 | −5.7239776E−06 | −1.9065419E−07 | −2.8759497E−08 |
| A11 | 3.1013165E−05 | 6.1758754E−07 | −4.5583276E−08 | −1.2225967E−08 |
| A12 | −7.7837347E−06 | 2.4398960E−07 | 5.3485862E−09 | 9.4461070E−10 |
| A13 | −1.7599849E−06 | −7.3886864E−08 | 5.5459375E−10 | 8.3855914E−11 |
| A14 | 1.2281672E−06 | −1.4360895E−09 | −8.1148605E−11 | −9.9278279E−12 |
| A15 | −9.1395399E−08 | 2.9375274E−09 | −4.5531991E−12 | −1.6287784E−13 |
| A16 | −6.0784881E−08 | −1.9017547E−10 | 7.6779070E−13 | 4.3963915E−14 |
| A17 | 1.2422264E−08 | −5.5363331E−11 | 2.2470633E−14 | −6.9690143E−16 |
| A18 | 5.0707140E−10 | 5.8994028E−12 | −4.1664211E−15 | −6.2998485E−17 |
| A19 | −3.2671505E−10 | 3.9589140E−13 | −4.9469722E−17 | 3.2617438E−18 |
| A20 | 2.3730773E−11 | −5.2542757E−14 | 9.7697856E−18 | −8.4650758E−20 |

Table 13 shows values corresponding to Conditional Formulae (1) through (7) for the imaging lenses of Examples 1 through 4. The values shown in Table 13 are those related to the d line.

TABLE 13

| Formula | | Example 1 | Example 2 | Example 3 | Example 4 |
|---|---|---|---|---|---|
| (1) | f1/f2 | 0.340 | 0.924 | 0.350 | 0.470 |
| (2) | f1/f3 | 0.165 | 0.085 | 0.110 | 0.107 |
| (3) | f·tanω/R3f | −0.358 | −0.235 | 0.176 | 0.053 |
| (4) | Nd6 | 1.682 | 1.682 | 1.682 | 1.682 |
| (5) | D12/(f·tanω) | 0.827 | 0.841 | 0.823 | 0.854 |
| (6) | Σd/TL | 0.504 | 0.523 | 0.503 | 0.430 |
| (7) | TL/(f·tanω) | 1.945 | 1.830 | 1.922 | 1.790 |

As can be understood from the data above, the imaging lenses of Examples 1 through 4 are configured to be compact, with values of TL/(f·tan ω) less than 2, have wide angles of view which are 70° or greater, favorably correct various aberrations, and have favorable optical performance compatible with large imaging elements.

Figure 9A:
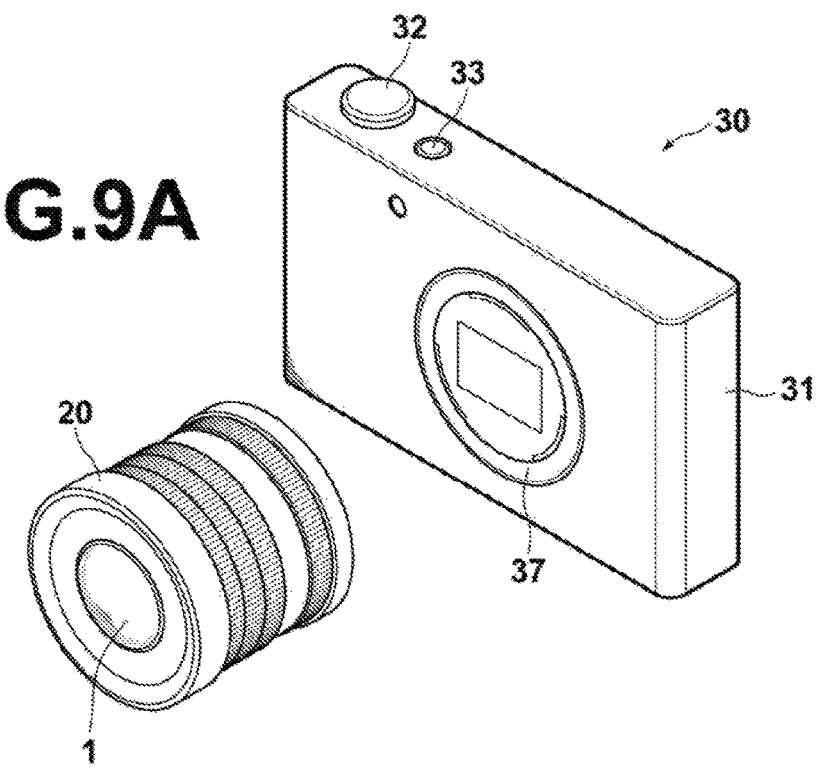
FIG. 9A is a schematic front view that illustrates an imaging apparatus according to an embodiment of the present disclosure.
Figure 9B:
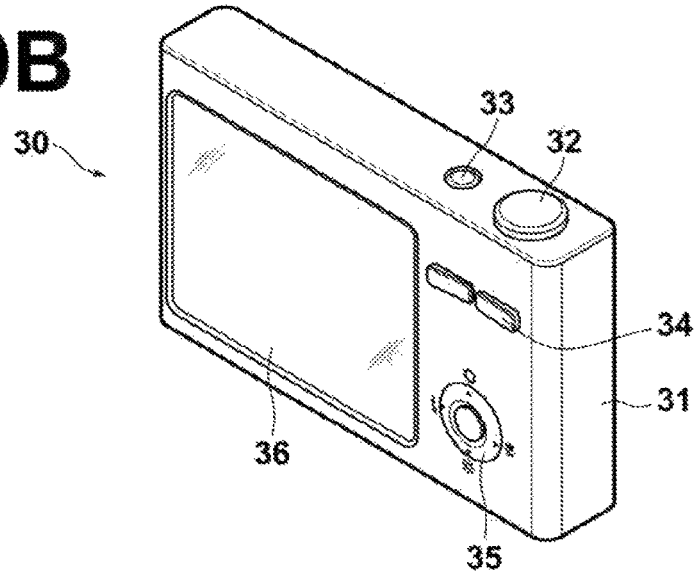
FIG. 9B is a schematic rear view of the imaging apparatus of the embodiment of the present disclosure.

Next, an imaging apparatus according to the present disclosure will be described. FIG. 9A and FIG. 9B illustrate the outer appearance of a camera 30, which is an imaging apparatus according to an embodiment of the present disclosure. FIG. 9A is a perspective view of the camera 30 as viewed from the front, and FIG. 9B is a perspective view of the camera 30 as viewed from the rear. The camera 30 is a single lens digital camera without a reflex finder, onto which an exchangeable lens 20 is interchangeably mounted. The exchangeable lens 20 is an imaging lens 1 according to an embodiment of the present disclosure housed within a lens barrel.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37.

An imaging device (not shown), such as a CCD (Charge Coupled Device) and a CMOS (Complementary Metal Oxide Semiconductor) that receives images of subjects formed by the exchangeable lens 20 and outputs image signals corresponding to the images, a signal processing circuit (not shown) that processes the image signals output by the imaging device to generate images, and a recording medium (not shown) for recording the generated images, are provided within the camera body 31. In this camera 30, photography of still images or video is performed by pressing the shutter release button 32. Image data obtained by photography are recorded in the recording medium.

By applying the imaging lens 1 according to the embodiment of the present disclosure to the exchangeable lens 20 for use in the camera 30 as described above, it will become possible to configure the camera 30 to be compact while employing a large imaging element, and the camera 30 will be capable of obtaining favorable images at a wide angle of view.

The present disclosure has been described with reference to the embodiments and Examples thereof. However, the present disclosure is not limited to the embodiments and Examples described above, and various modifications are possible. For example, the values of the radii of curvature of each lens, the distances among surfaces, the refractive indices, the Abbe's numbers, the aspherical surface coefficients, etc., are not limited to the numerical values indicated in connection with the Examples, and may be other values.

In addition, the single lens digital camera without a reflex finder was described with reference to the drawings as the embodiment of the imaging apparatus. However, the present disclosure is not limited to this intended use, and may be applied to a single lens reflex camera, a film camera, a video camera, and the like, for example.

What is claimed is:

1. An imaging lens, consisting of, in order from the object side to the image side:
   a first lens group having a positive refractive power as a whole;
   a stop;

a second lens group having a positive refractive power as a whole; and a third lens group having a positive refractive power as a whole;

the first lens group comprising, consecutively in order from the most object side thereof, a negative lens and a positive lens;

the second lens group consisting of three lenses including a positive lens and a negative lens;

the third lens group comprising, consecutively in order from the most object side thereof, a negative lens and a positive lens; and Conditional Formula (1) below being satisfied:

$$0<f1/f2<2 \qquad (1)$$

wherein f1 is the focal length of the first lens group, and f2 is the focal length of the second lens group.

2. An imaging lens as defined in claim 1, in which Conditional Formula (1-1) below is satisfied:

$$0.3<f1/f2<1 \qquad (1\text{-}1).$$

3. An imaging lens as defined in claim 1, in which Conditional Formula (2) below is satisfied:

$$0<f1/f3<0.6 \qquad (2)$$

wherein f3 is the focal length of the third lens group.

4. An imaging lens as defined in claim 3, in which Conditional Formula (2-1) below is satisfied:

$$0.05<f1/f3<0.3 \qquad (2\text{-}1).$$

5. An imaging lens as defined in claim 1, in which Conditional Formula (3) below is satisfied:

$$-1<f\cdot\tan\omega/R3f<1 \qquad (3)$$

wherein f is the focal length of the entire lens system, $\omega$ is the half angle of view, and R3f is the radius of curvature of the surface toward the object side of the lens most toward the object side within the third lens group.

6. An imaging lens as defined in claim 5, in which Conditional Formula (3-1) below is satisfied:

$$-0.5<f\cdot\tan\omega/R3f<0.5 \qquad (3\text{-}1).$$

7. An imaging lens as defined in claim 1, wherein:
the second lens group consists of, in order from the object side to the image side, a negative lens, a positive lens, and a negative lens.

8. An imaging lens as defined in claim 1, in which Conditional Formula (4) below is satisfied:

$$Nd6<1.75 \qquad (4)$$

wherein Nd6 is the refractive index with respect to the d line of the negative lens most toward the object side within the third lens group.

9. An imaging lens as defined in claim 8, in which Conditional Formula (4-1) below is satisfied:

$$Nd6<1.7 \qquad (4\text{-}1).$$

10. An imaging lens as defined in claim 1, in which Conditional Formula (5) below is satisfied:

$$0.7<D12/(f\cdot\tan\omega)<1 \qquad (5)$$

wherein D12 is the distance along the optical axis from the lens surface most toward the object side within the first lens group to the lens surface most toward the image side within the second lens group, f is the focal length of the entire lens system, and $\omega$ is the half angle of view.

11. An imaging lens as defined in claim 10, in which Conditional Formula (5-1) below is satisfied:

$$0.8<D12/(f\cdot\tan\omega)<0.9 \qquad (5\text{-}1).$$

12. An imaging lens as defined in claim 1, wherein:
the first lens group consists of, in order from the object side to the image side, a negative meniscus lens and a positive lens.

13. An imaging lens as defined in claim 1, wherein:
the lens surface most toward the object side within the second lens group is a concave surface; and
the lens surface most toward the image side within the second lens group is a convex surface.

14. An imaging lens as defined in claim 1, wherein:
the third lens group consists of, in order from the object side to the image side, a negative lens and a positive lens.

15. An imaging lens as defined in claim 1, in which Conditional Formula (6) below is satisfied:

$$0.35<\Sigma d/TL<0.6 \qquad (6)$$

wherein $\Sigma d$ is the sum of the center thicknesses of all of the lenses, and TL is the sum of the distance along the optical axis from the lens surface most toward the object side to the lens surface most toward the image side and the back focus as an air converted length.

16. An imaging lens as defined in claim 15, in which Conditional Formula (6-1) below is satisfied:

$$0.4<\Sigma d/TL<0.55 \qquad (6\text{-}1).$$

17. An imaging lens as defined in claim 1, in which Conditional Formula (7) below is satisfied:

$$1.5<TL/(f\cdot\tan\omega)<2.4 \qquad (7)$$

wherein TL is the sum of the distance along the optical axis from the lens surface most toward the object side to the lens surface most toward the image side and the back focus as an air converted length, f is the focal length of the entire lens system, and $\omega$ is the half angle of view.

18. An imaging lens as defined in claim 17, in which Conditional Formula (7-1) below is satisfied:

$$1.7<TL/(f\cdot\tan\omega)<2 \qquad (7\text{-}1).$$

19. An imaging lens as defined in claim 1, wherein:
the third lens group is fixed with respect to an image formation plane while the first lens group, the stop, and the second lens group move integrally during focusing operations.

20. An imaging apparatus equipped with an imaging lens as defined in claim 1.

* * * * *